(12) United States Patent
Østergaard et al.

(10) Patent No.: US 7,913,716 B2
(45) Date of Patent: Mar. 29, 2011

(54) SEALING ELEMENT AND A COUPLING DEVICE PROVIDED WITH SUCH A SEALING ELEMENT

(75) Inventors: Inge Østergaard, Heggedal (NO); Erik Raad, Oslo (NO)

(73) Assignee: Vetco Gray Scandinavia AS, Sandvika (NO)

( * ) Notice: Subject to any disclaimer, the term of this patent is extended or adjusted under 35 U.S.C. 154(b) by 526 days.

(21) Appl. No.: 11/795,765

(22) PCT Filed: Jan. 19, 2006

(86) PCT No.: PCT/IB2006/000077
§ 371 (c)(1),
(2), (4) Date: May 19, 2008

(87) PCT Pub. No.: WO2006/077482
PCT Pub. Date: Jul. 27, 2006

(65) Prior Publication Data
US 2009/0048028 A1 Feb. 19, 2009

(30) Foreign Application Priority Data
Jan. 20, 2005 (NO) .................................. 20050313

(51) Int. Cl.
*F16J 15/08* (2006.01)
*E21B 17/02* (2006.01)
(52) U.S. Cl. ............ 137/614.03; 137/614.04; 251/149.1; 251/149.6; 285/226; 285/917; 277/607; 277/610; 277/626
(58) Field of Classification Search .................. 137/614.02–614.05; 251/149.1, 251/149.6, 281, 282, 335.3; 285/226, 917; 277/602, 607, 608, 610, 626
See application file for complete search history.

(56) References Cited

U.S. PATENT DOCUMENTS

| 3,857,572 | A | | 12/1974 | Taylor et al. |
| 4,603,892 | A | | 8/1986 | Abbes et al. |
| 4,643,463 | A | * | 2/1987 | Halling et al. ................. 285/226 |
| 4,652,025 | A | * | 3/1987 | Conroy, Sr. .................... 285/226 |
| 5,365,972 | A | * | 11/1994 | Smith, III ................ 137/614.04 |
| 7,143,994 | B2 | * | 12/2006 | Ostergaard et al. ........ 251/149.6 |
| 2004/0239053 | A1 | | 12/2004 | Rowe et al. |

FOREIGN PATENT DOCUMENTS
GB 2293221 A 3/1996
GB 2404426 A 2/2005

OTHER PUBLICATIONS
PCT/ISA/210—International Search Report—May 19, 2006.
PCT/ISA/409—International Preliminary Report on Patentability—Jan. 24, 2007.
Norwegian Search Report—Nov. 24, 2005.

* cited by examiner

*Primary Examiner* — Kevin L Lee
(74) *Attorney, Agent, or Firm* — Venable LLP; Eric J. Franklin

(57) ABSTRACT

A sealing element including a tube-shaped body of metallic material and first and second male sealing members arranged at a respective end of the body. At least two intermediate members are arranged in series in the body between the first and second male sealing members. Each one of the intermediate members is compressible so as to be capable to store elastic energy when the body is subjected to axial compression and includes a protuberance arranged in the body and extending around the center axis of the body. A coupling device provided with such a sealing element.

27 Claims, 8 Drawing Sheets

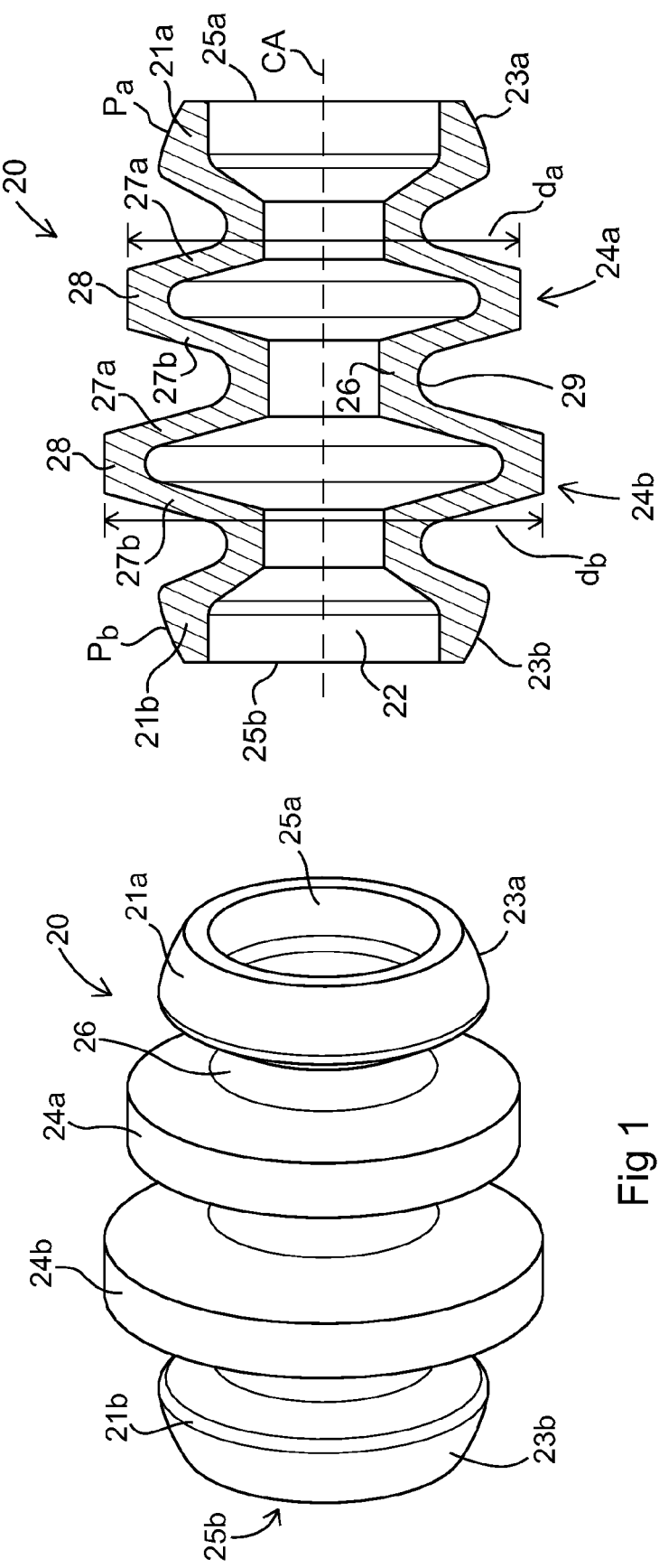

SEALING ELEMENT AND A COUPLING DEVICE PROVIDED WITH SUCH A SEALING ELEMENT

CROSS-REFERENCE TO RELATED APPLICATIONS

This application claims priority to Norwegian patent application 20050313 filed Jan. 20, 2005 and is the national phase under 35 U.S.C. 371 of PCT/IB2006/000077 filed Jan. 19, 2006.

FIELD OF THE INVENTION AND PRIOR ART

The present invention relates to a sealing element and a coupling device provided with such a sealing element.

In this description and the subsequent claims, the term "fluid" refers to a flowing medium in gaseous or liquid form. Consequently, the expression "fluid-tight seal" implies a seal that is liquid-tight as well as gas-tight.

Development within offshore oil and gas exploration in the recent years has been directed to subsea installations for processing and transport of oil and gas. These subsea installations replace the traditional platforms, where oil and gas are transported up to the platform for further processing and transport. This development of subsea production, processing and transport systems has resulted in an increasing need for subsea coupling and sealing elements, e.g. for coupling together conduits belonging to interconnectable processing modules in a fluid-tight manner. It has been realised that seals based on corrosion resistant metallic materials are more suitable than conventional elastomer seals for use in subsea applications. It has further been experienced that elastomer seals have shown signs of degeneration in course of time due to ageing, which may result in loss of flexibility and/or cause water ingress. This problem is eliminated by the use of a metal seal.

A coupling device for subsea use is previously known from GB 2293221 A. This coupling device comprises a male coupling part, a corresponding female coupling part and an intermediate metal seal. The metal seal is preloaded by urging said coupling parts against each other. The male coupling part is provided with two projections which fit into helical grooves in the female coupling part, and the coupling parts are urged towards each other by a rotation of the male coupling part in relation to the female coupling part. This construction puts high demands on the tolerances and the alignment of the coupling parts and is therefore costly to manufacture and also rather complicated to assemble.

SUMMARY OF THE INVENTION

A first object of the present invention is to provide a sealing element making possible a reliable sealing between two interconnectable parts with relatively low requirements with respect to relative tolerances.

According to the invention, this object is achieved by a sealing element. The tube-shaped metallic body of the sealing element according to the invention is provided with two intermediate members, which are compressible so as to be capable to store elastic energy when the sealing element is subjected to axial compression. Hereby, the sealing element is, when it is fitted between two female sealing members, able to store elastic energy as said female sealing members are mutually pressed towards each other in order to form fluid-tight seals between the respective male sealing member and the corresponding female sealing member, which allows for larger tolerances in the axial positioning of the sealing members and in the forces exerted in the interconnection of the male and female sealing members. The compressible intermediate members are each formed in the body in a simple and efficient manner by being formed as a protuberance in the body extending around the centre axis of the body.

According to a preferred embodiment of the invention, at least one, preferably each one, of the male sealing members has an external spherical contact surface designed for mating with a corresponding internal conical contact surface of a female sealing member so as to form a fluid-tight seal between the male sealing member and this female sealing member when their contact surfaces are pressed against each other. Hereby, the sealing element is capable of providing a reliable sealing effect even when the interconnecting sealing members are somewhat out of alignment with each other, i.e. even when the respective male sealing member of the sealing element is connected to a corresponding female sealing member that is somewhat out of alignment with the male sealing member. Furthermore, by having spherical contact surfaces and corresponding conical contact surfaces, the tolerance requirements of the interconnecting sealing members are relatively low as compared to the state-of-the-art systems.

According to another preferred embodiment of the invention, the respective intermediate member is expandable in the axial direction of the body by an internal fluid pressure in the internal bore of the body so as to urge the respective male sealing member outwards in the axial direction of the body against the corresponding female sealing member when the sealing element is fitted between said female sealing members, thereby increasing the sealing contact pressure between the respective male sealing member and the corresponding female sealing member.

A second object of the present invention is to provide a coupling device making possible a simple interconnection of two coupling parts with relatively low requirements with respect to relative tolerances between the two coupling parts, while offering a reliable sealing between them.

According to the invention, this object is achieved by a coupling device. In the inventive coupling device, the male coupling part is connectable to the female coupling part via a sealing element, which is fixed to the male coupling part. The tube-shaped metallic body of the sealing element is provided with at least two intermediate members, which are compressible so as to be capable to store elastic energy when the sealing element is subjected to axial compression. Hereby, the sealing element is, when the male coupling part is connected to the female coupling part with the sealing element clamped between the female sealing member of the male coupling part and the female sealing member of the female coupling part, able to store elastic energy as said female sealing members are mutually pressed towards each other in order to form fluid-tight seals between the respective male sealing member and the corresponding female sealing member, which allows for larger tolerances in the axial positioning of the sealing members and in the forces exerted in the interconnection of the male and female sealing members. The compressible intermediate members are each formed in the body in a simple and efficient manner by being formed as a protuberance in the body extending around the centre axis of the body.

According to a preferred embodiment of the inventive coupling device, at least one, preferably each one, of the male sealing members has an external spherical contact surface designed for mating with a corresponding internal conical contact surface of the associated female sealing member so as to form a fluid-tight seal between the male sealing member and the female sealing member when their contact surfaces are pressed against each other. When the coupling device is assembled, i.e. when the two coupling parts are pressed against each other, the mutually contacting sealing members form metal seals which are capable of providing a reliable sealing effect even when the coupling parts and the associated sealing members are somewhat out of alignment with each other. Furthermore, by having spherical contact surfaces and corresponding conical contact surfaces, the tolerance requirements of the coupling parts and the associated sealing members are relatively low as compared to the state-of-the-art systems.

According to another preferred embodiment of the inventive coupling device, the respective intermediate member is expandable in the axial direction of the body by an internal fluid pressure in the internal bore so as to urge the respective male sealing member outwards in the axial direction of the body against the corresponding female sealing member when the male coupling part is connected to the female coupling part with the sealing element clamped between the female sealing member of the male coupling part and the female sealing member of the female coupling part, thereby increasing the sealing contact pressure between the respective male sealing member and the corresponding female sealing member.

According to another preferred embodiment of the inventive coupling device, the intermediate members comprise a first intermediate member and an adjacent second intermediate member, the sealing element being secured to the male coupling part by means of a retaining member having a part received in the space between the first intermediate member and the second intermediate member. Hereby, the sealing element is secured to the male coupling part in a simple and efficient manner.

Another preferred embodiment of the inventive coupling device is characterized in:
   that at least one, preferably each one, of the male and female coupling parts is provided with a valve, which comprises a displaceable valve body and a spring member acting on the valve body, the valve body being displaceable against the action of the spring member from a first position, in which the valve is closed and prevents fluid flow through the flow channel of the coupling part, to a second position, in which the valve is open and allows fluid flow through the flow channel of the coupling part; and
   that at least one of the coupling parts is provided with an actuation member for displacing the valve body from said first position to said second position immediately before the second male sealing member is brought into engagement with the female sealing member of the female coupling part.

Hereby, the flow channel of the respective coupling part is automatically opened, so as to allow for an internal flow of fluid through the coupling device, when the seal between the female sealing member of the female coupling part and the second male sealing member of the sealing element is established as the female coupling part and the male coupling part are mutually displaced into contact with each other during an interconnection of the two coupling parts. Likewise, the flow channel of the respective coupling part is automatically closed when said seal is broken as the female coupling part and the male coupling part are mutually displaced out of contact with each other during a disconnection of the two coupling parts.

According to another preferred embodiment of the inventive coupling device, the actuation member is displaceably arranged in the internal bore of the sealing element so as to be capable of displacing the valve body of the male coupling part as well as the valve body of the female coupling part from said first position to said second position immediately before the second male sealing member of the sealing element is brought into engagement with the female sealing member of the female coupling part. Hereby, said valve bodies are both actuated in a simple manner by one and the same actuation member.

Further advantages as well as advantageous features of the sealing element and the coupling device according to the present invention will appear from the following description and the dependent claims.

BRIEF DESCRIPTION OF THE DRAWINGS

With reference to the appended drawings, a specific description of preferred embodiments of the invention cited as examples follows below.

In the drawings:
FIG. 1 is a perspective view of a sealing element according to the invention;
FIG. 2 shows the sealing element according to FIG. 1 in a longitudinal section.

DETAILED DESCRIPTION OF PREFERRED EMBODIMENTS OF THE INVENTION

Figure 3:
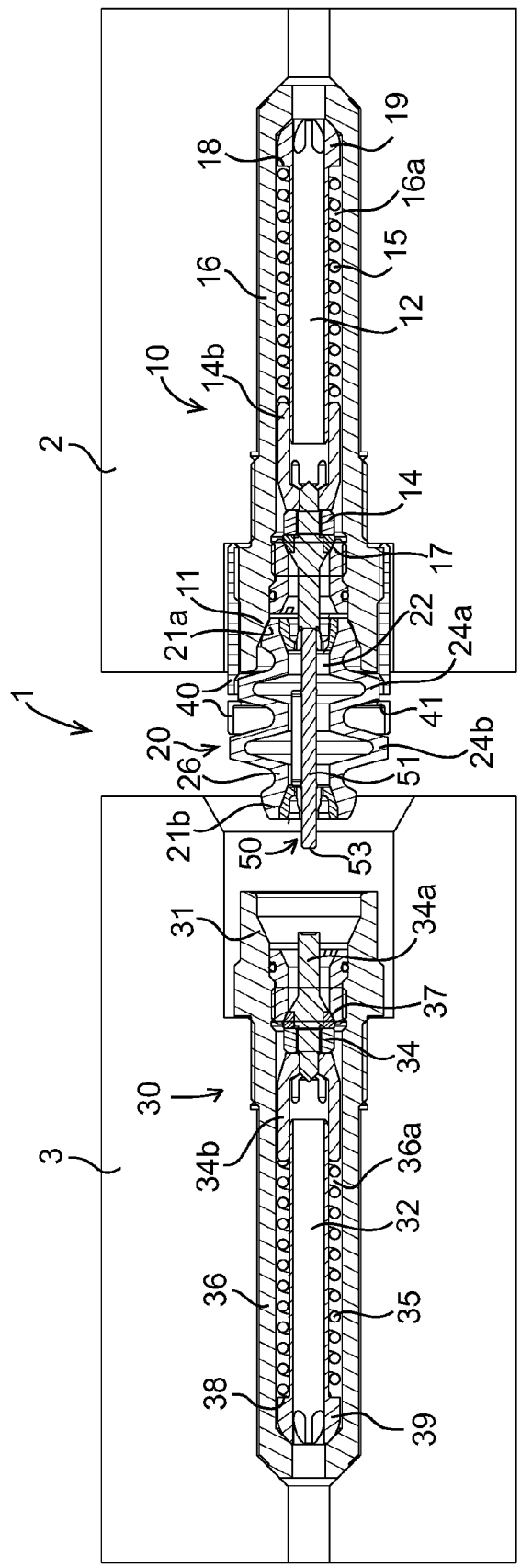
FIG. 3 is a schematical illustration of a first embodiment of a coupling device according to the invention as seen in a longitudinal section and with the male coupling part disconnected from the female coupling part.

A sealing element 20 according to the present invention is illustrated in FIG. 1. The sealing element comprises a hollow, tube-shaped body 26 of metallic material, preferably corrosion resistant metallic material. A first male sealing member 21a is formed at a first end of the body 26. Said first male sealing member 21a has an external spherical contact surface 23a designed for mating with a corresponding internal conical contact surface of a first female sealing member so as to form a fluid-tight seal between the first male sealing member and the first female sealing member when their contact surfaces are pressed against each other. A second male sealing member 21b is formed at a second end of the body 26 opposite said first end. Said second male sealing member 21b has an external spherical contact surface 23b designed for mating with a corresponding internal conical contact surface of a second female sealing member so as to form a fluid-tight seal between the second male sealing member and the second female sealing member when their contact surfaces are pressed against each other. An internal bore 22 extends through the body 26 and through the first and second male sealing members 21a, 21b. The internal bore 22 ends at openings 25a, 25b provided at the respective end of the male sealing members 21a, 21b. Consequently, the first male sealing member 21a is connected to the second male sealing member 21b via the internal bore 22. The spherical contact surface 23a, 23b of the respective male sealing member 21a, 21b surrounds said internal bore 22. The contact surfaces 23a, 23b are to be of metallic material, preferably corrosion resistant metallic material, and the body 26 and the male sealing members 21a, 21b are preferably formed in one piece. The male sealing members 21a, 21b are preferably coaxial with each other, as illustrated in FIG. 2.

The body 26 is provided with two intermediate members 24a, 24b formed in series in the body 26 between the first and second male sealing members 21a, 21b. The intermediate members 24a, 24b form a continuous part together with the first and second male sealing members 21a, 21b. The respective intermediate member 24a, 24b is compressible so as to be capable to store elastic energy when the body 26 is subjected to axial compression and consists of a ring-shaped protuberance formed in the body 26 and extending around the centre axis CA of the body. The respective protuberance constitutes a V-shaped and radially protruding fold in the tubular wall of the body 26. The respective protuberance 24a, 24b is rotationally symmetric in relation to the centre axis CA of the body 26. In the embodiment illustrated in FIGS. 1 and 2, the respective protuberance is formed by two wall parts 27a, 27b of the body 26 inclining towards each other so as to meet at a crest 28 extending in a circle around the centre axis CA of the body 26. Each one of said wall parts 27a, 27b has essentially the shape of a truncated cone. When the two male sealing members 21a, 21b are pressed towards each other with a certain pressing force, the two wall parts 27a, 27b of the respective protuberance will be displaced elastically towards each other in the axial direction of the body 26. The intermediate members 24a, 24b will thus act like a compression spring. The two adjacent protuberances 24a, 24b of the sealing element are separated by an intermediate valley 29. It is realised that the intermediate members 24a, 24b should have a wall thickness thin enough to give the intermediate members 24a, 24b the desired mechanical stiffness so as to allow for the axial compressions and expansions thereof, still maintaining safe allowable stresses and deflections. The intermediate members 24a, 24b are of metallic material, preferably corrosion resistant metallic material, and are preferably formed in one piece with the rest of the body 26. The internal bore 22 of the sealing element 20 extends through the intermediate members 24a, 24b. The intermediate members 24a, 24b are preferably coaxial with the male sealing members 21a, 21b, as illustrated in FIG. 2.

In the illustrated embodiment, the sealing element 20 is provided with two intermediate members 24a, 24b of the above-indicated type, but the inventive sealing element could also be provided with more than two such intermediate members formed in series in the body 26 between the first and second male sealing members 21a, 21b.

The respective intermediate member 24a, 24b has an internal cross-sectional area at its widest part which is larger than the external cross-sectional area of the respective male sealing member 21a, 21b as seen at the point $P_a$, $P_b$ of the male sealing member where the male sealing member is designed to engage with the corresponding female sealing member. Hereby, the respective intermediate member 24a, 24b is expandable in the axial direction of the sealing element 20 by an internal fluid pressure in the sealing element, i.e. a fluid pressure inside the internal bore 22, so as to urge the respective male sealing member 21a, 21b against the corresponding female sealing member when the sealing element 20 is fitted between said female sealing members, thereby increasing the sealing contact pressure between the respective male sealing member and the corresponding female sealing member. In the illustrated embodiment, one 24a of the intermediate members, the right one in FIGS. 1 and 2, has an external diameter $d_a$ at its widest part which is smaller than the external diameter $d_b$ of the other intermediate member 24b at its widest part.

The sealing element 20 is intended to be fitted between female sealing members of for instance two coupling parts so as to allow said parts to be connected to each other in a fluid-tight manner, as will be more closely described below with reference to FIGS. 3-8.

Figure 4:
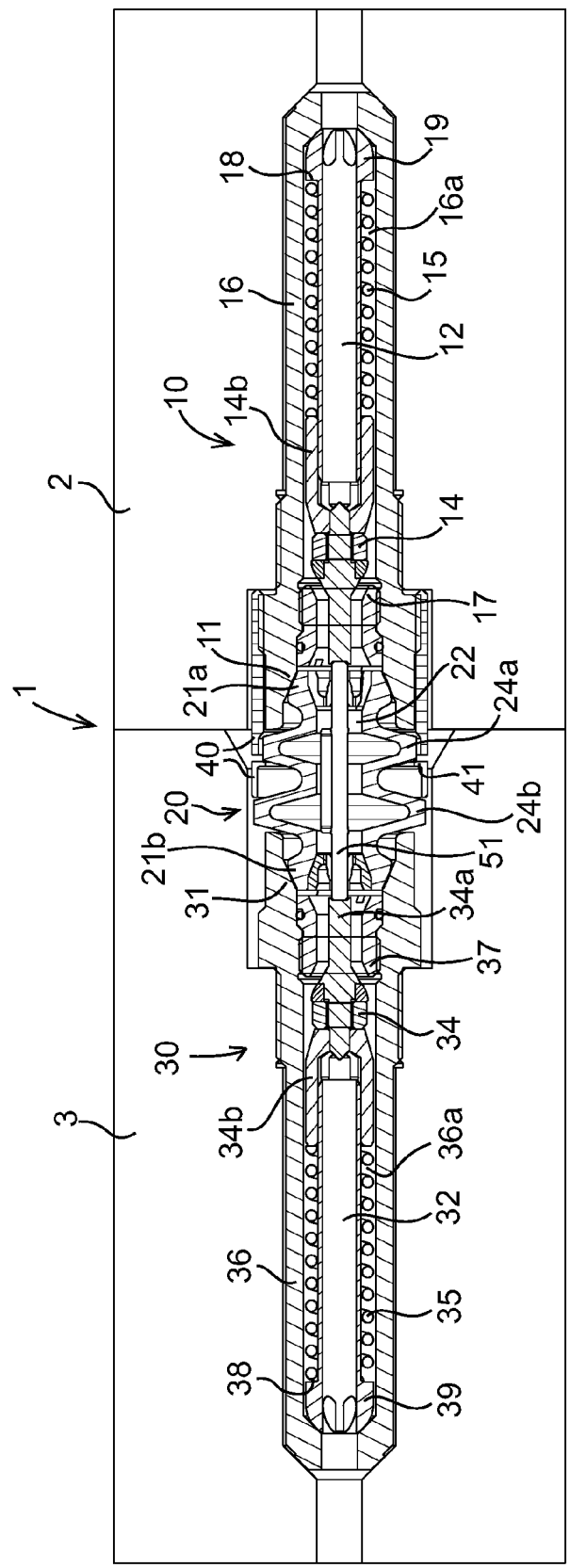
FIG. 4 is a schematical illustration of the coupling device of FIG. 3 as seen in a longitudinal section and with the male coupling part connected to the female coupling part.
Figure 5:
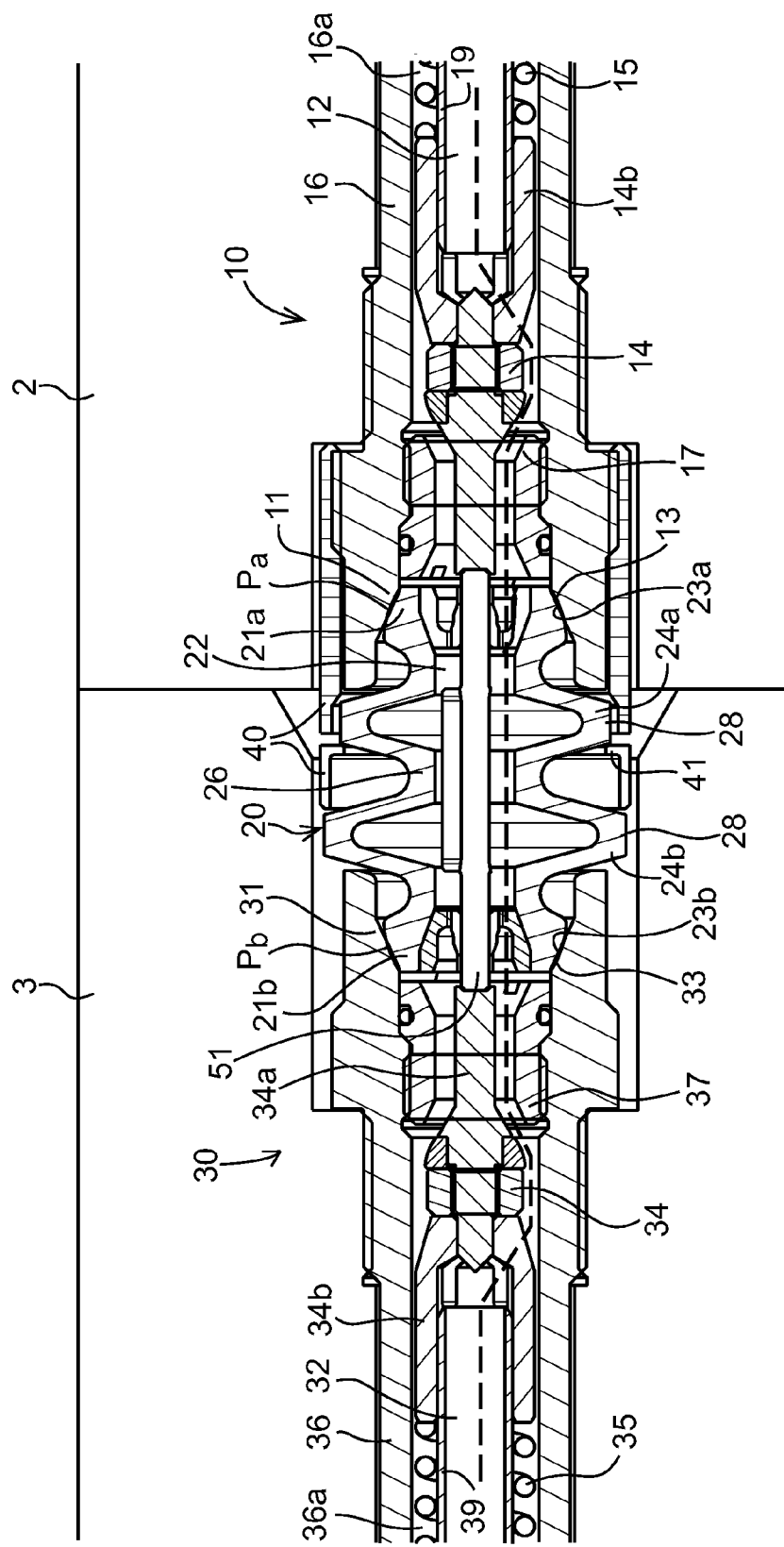
FIG. 5 shows a part of the coupling device of FIG. 4 in larger scale.
Figure 6:
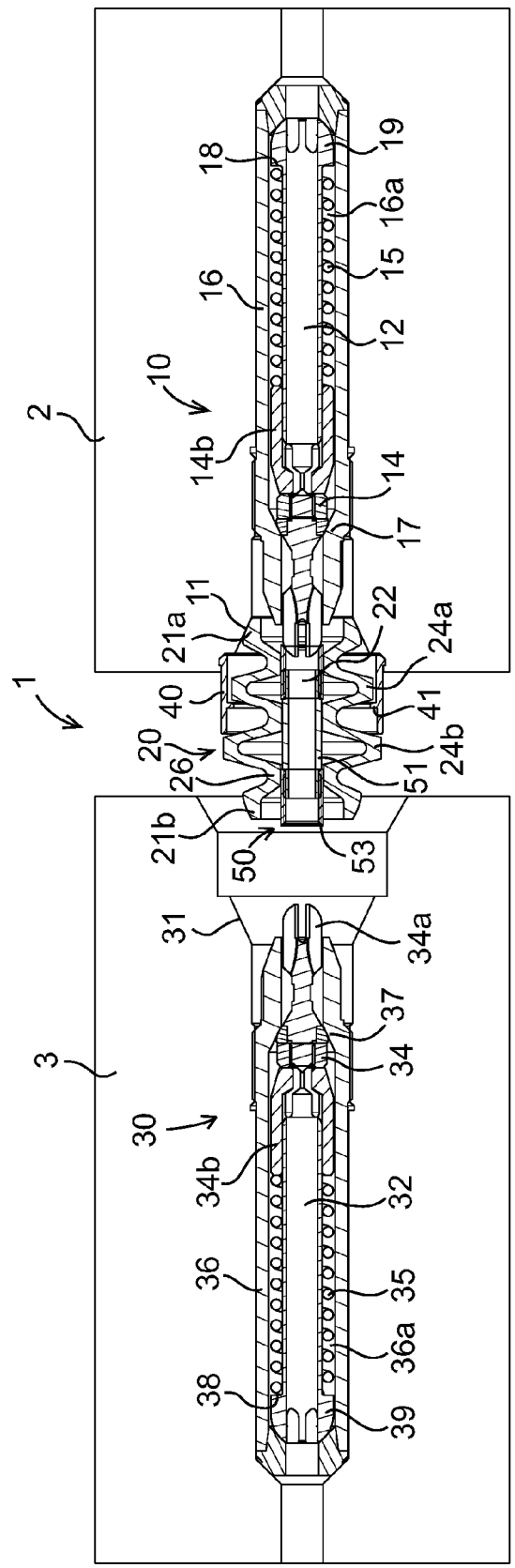
FIG. 6 is a schematical illustration of a second embodiment of a coupling device according to the invention as seen in a longitudinal section and with the male coupling part disconnected from the female coupling part.
Figure 7:
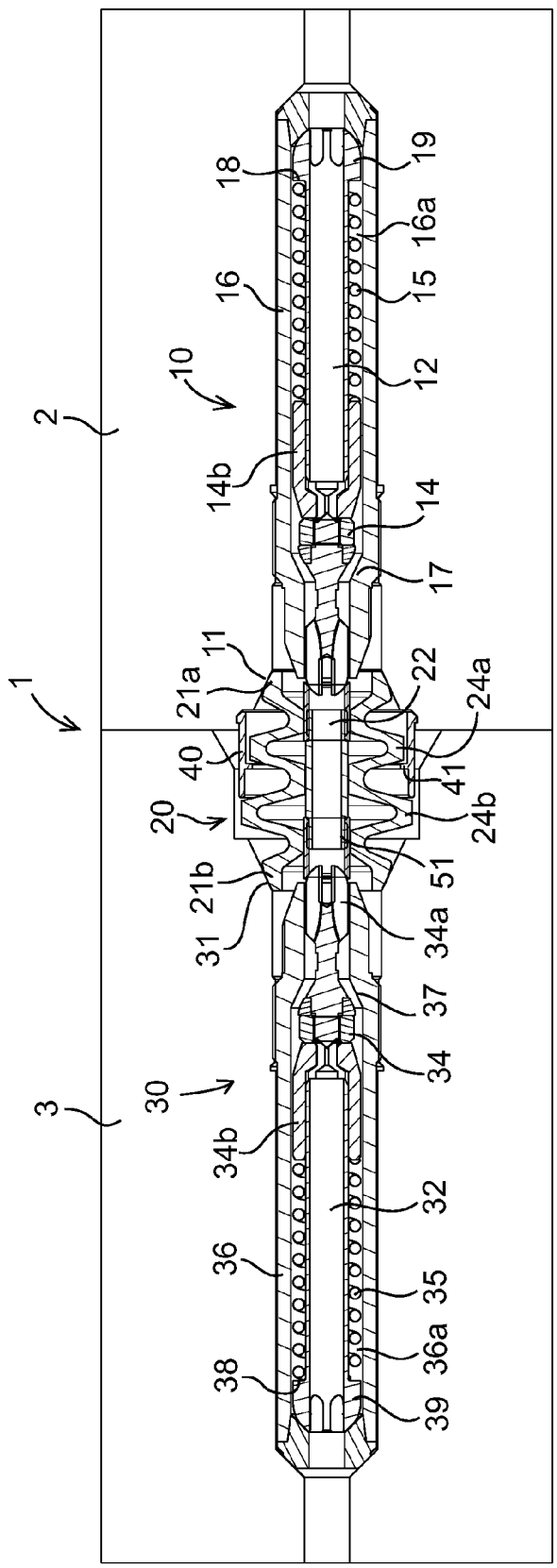
FIG. 7 is a schematical illustration of the coupling device of FIG. 6 as seen in a longitudinal section and with the male coupling part connected to the female coupling part.
Figure 8:
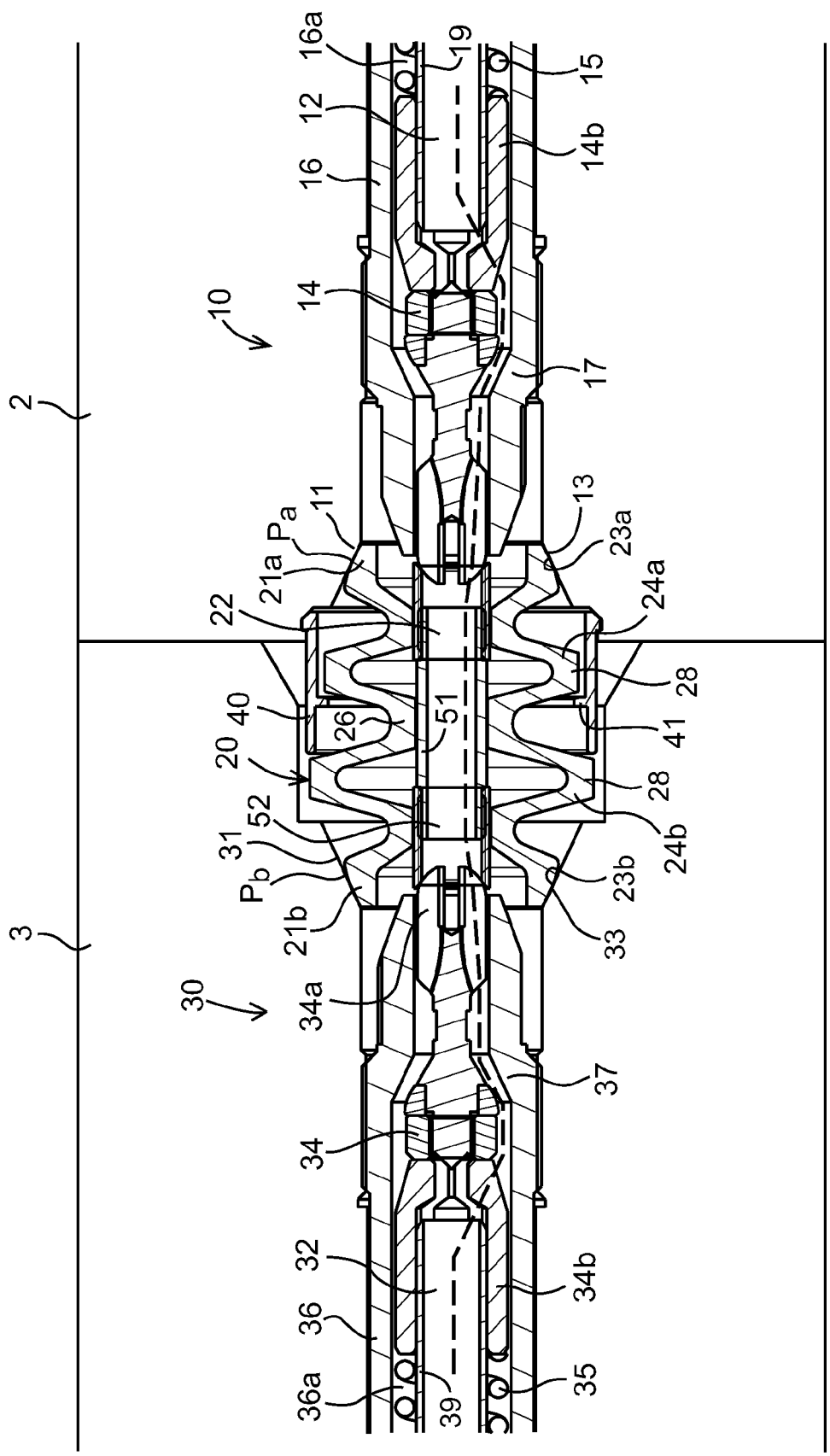
FIG. 8 shows a part of the coupling device of FIG. 6 in larger scale.

A first embodiment of a coupling device 1 according to the present invention is illustrated in FIGS. 3-5 and a second embodiment of a coupling device 1 according to the present invention is illustrated in FIGS. 6-8. The respective coupling device comprises a male coupling part 10 and a female coupling part 30. The male coupling part 10 is connectable to the female coupling part 30 via a sealing element 20 of the type described above with reference to FIGS. 1 and 2, which is fixed to the male coupling part 10. The sealing element 20 is consequently provided with a first male sealing member 21a at a first end thereof and a second sealing member 21b at a second end thereof. The sealing element 20 has an internal bore 22 extending through the sealing element and its sealing members 21a, 21b. The male coupling part 10 comprises a female sealing member 11, which is sealingly engaged or sealingly engageable with the first male sealing member 21a of the sealing element 20, and the female coupling part 30 comprises a female sealing member 31, which is sealingly engageable with the second male sealing member 21b of the sealing element 20. The tube-shaped metallic body 26 of the sealing element 20 is provided with two intermediate members 24a, 24b of the type described above with reference to FIGS. 1 and 2, which are compressible so as to be capable to store elastic energy when the sealing element 20 is subjected to axial compression. When the male coupling part 10 is being connected to the female coupling part 30 the sealing element 20 will be clamped between the female sealing member 11 of the male coupling part and the female sealing member 31 of the female coupling part. Owing to the intermediate members 24a, 24b, the sealing element 20 is able to store elastic energy as said female sealing members 11, 31 are mutually pressed towards each other during the connection of the coupling parts 10, 30 in order to form fluid-tight seals between the respective male sealing member 21a, 21b and the corresponding female sealing member 11, 31.

The first male sealing member 21a of the sealing element has an external spherical contact surface 23a (see FIGS. 5 and 8) of metallic material designed for mating with a corresponding internal conical contact surface 13 of the female sealing member 11 of the male coupling part 10 so as to form a fluid-tight seal between the first male sealing member 21a and this female sealing member 11 when their contact surfaces are pressed against each other. Said conical contact surface 13 is of metallic material. It is realised that the described coupling devices require a certain axial pre-tension force to be maintained in order to ensure proper seal seating and avoid coupling separation under pressure loads.

The second male sealing member 21b of the sealing element 20 has an external spherical contact surface 23b (see FIGS. 5 and 8) of metallic material designed for mating with a corresponding internal conical contact surface 33 of the female sealing member 31 of the female coupling part 30 so as to form a fluid-tight seal between the second male sealing member 21b and this female sealing member 31 when their contact surfaces are pressed against each other. Said conical contact surface 33 is of metallic material.

It is realised that the contact surfaces 13, 23a, 23b, 33 should have a suitable surface smoothness so as to allow a fluid-tight contact between said contact surfaces. The respective contact surface 13, 23a, 23b, 33 is suitably of a corrosion resistant metallic material.

The male coupling part 10 and the female coupling part 30 each have an internal flow channel 12, 32. The flow channel 12, 32 of the respective coupling part 10, 30 extends through the associated female sealing member 11, 31. The flow channel 12 of the male coupling part and the flow channel 32 of the female coupling part 30 are designed to be in fluid communication with the internal bore 22 of the sealing element 20 when the male coupling part 10 is connected to the female coupling part 30.

When the respective pair of sealing members 11, 21a and 31, 21b are pressed against each other so as to form a seal between the male sealing member 21a, 21b and the corresponding female sealing member 11, 31, said flow channels 12, 32 will be interconnected via the internal bore 22 of the sealing element so as to allow an internal flow of fluid through the coupling parts 10, 30. The flow passage formed by these flow channels 12, 32 and the internal bore 22 will consequently be sealed from the surroundings by the seals formed between the respective pair of sealing members. The coupling parts 10, 30 are e.g. intended to be connected to a respective fluid carrying conduit, so as to allow for an interconnection of these conduits.

At least one of the coupling parts 10, 30 is displaceable in the axial direction towards and away from the opposite coupling part 30, 10 so as to make possible the assembling and disassembling of the coupling device. When the coupling device is to be assembled, the coupling parts 10, 30 are mutually displaced towards each other so as to establish the required sealing contact pressure between the respective male sealing member and the corresponding female sealing member. The coupling parts are then secured in relation to each other. This displacing and securing of the coupling parts may be accomplished by any suitable means. It is realised that the coupling device is disassembled in the opposite order.

FIGS. 3-8 illustrate the respective coupling device 1 with the coupling parts 10, 30 arranged in alignment with each other. Owing to the shape of the sealing members 11, 21a, 21b, 31, the illustrated coupling device 1 may, however, also be used for interconnecting two coupling parts 10, 30 that are somewhat out of alignment with each other.

In the embodiments illustrated in FIGS. 3-5 and FIGS. 6-8, the coupling device 1 is designed for interconnecting two connecting bodies 2, 3. The male coupling part 10 forms part of a first one 2 of said connecting bodies, which e.g. could constitute a wellhead connector body, and the female coupling part 30 forms part of a second one 3 of said connecting bodies, which e.g. could constitute a tubing hanger body. In the illustrated embodiments, the respective coupling part 10, 30 comprises a tube-shaped housing 16, 36, through which the flow channel 12, 32 of the coupling part extends. The respective housing 16, 36 is secured to the associated connecting body 2, 3, preferably by being threaded into it. The respective housing 16, 36 is preferably provided with an external thread designed to fit into an internal thread of the associated connecting body 2, 3. In the embodiment illustrated in FIGS. 3-5, the female sealing member 11, 31 of the respective coupling part 10, 30 is integrated in the associated housing 16, 36 at the outwardly directed end thereof. In the embodiment illustrated in FIGS. 6-8, the female sealing member 11, 31 of the respective coupling part 10, 30 is integrated in the associated connecting body 2, 3 and the tube-shaped housing 16, 36 of the respective coupling part is here secured in the associated connecting body 2, 3 with its outwardly directed end located on a level with the female sealing member 11, 31.

The intermediate members of the sealing element 20 comprise a first intermediate member 24a and an adjacent second intermediate member 24b. The sealing element 20 is secured to the male coupling part 10 by means of a retaining member 40 having a part 41 received in the space between the first intermediate member 24a and the second intermediate member 24b. In the embodiment illustrated in FIGS. 3-5, the retaining member 40 is formed as a retaining sleeve that is fixedly secured to the male coupling part 10 by being secured directly to the housing 16 of the male coupling part, e.g. by being threaded onto the outer end of said housing 16. Thus, the retaining member 40 is mounted so as to be immovable in relation to said housing 16. In the embodiment illustrated in FIGS. 6-8, the retaining member 40 is formed as a retaining sleeve that is fixedly secured to the male coupling part 10 by being secured directly to the associated connecting body 2. Also in the latter case, the retaining member 40 is mounted so as to be immovable in relation to the housing 16 of the male coupling part. In both embodiments, the retaining member 40 surrounds the first intermediate member 24a and has an inwardly protruding flange 41 that is received in the space between the first and second intermediate members 24a, 24b. Said flange 41 is designed to limit the axial movability of the sealing element 20 in the direction away from the female sealing member 11 of the male coupling part 10 by abutting against the first intermediate member 24a so as to thereby keep the sealing element 20 secured to the male coupling part 10, while still allowing the first intermediate member 24a to expand in the axial direction of the sealing element 20 towards the female sealing member 11 of the male coupling part and the second intermediate member 24b to expand in the opposite direction.

The sealing element 20 may be fixed in position in relation to the first valve part 10 in such a manner that the contact surface 23a of the first male sealing member 21a is maintained in contact with the corresponding contact surface 13 of the female sealing member 11 irrespective of the mutual axial position between the male and female valve parts 10, 30.

In the illustrated embodiments, the first intermediate member 24a has an external diameter $d_a$ at its widest part which is smaller than the external diameter $d_b$ of the second intermediate member 24b at its widest part. The difference between said external diameters $d_a$ and $d_b$ is preferably such that the above-indicated retaining sleeve 40 may be arranged around the first intermediate member 24a with the outer surface of the retaining sleeve 40 essentially flush with the widest part of the second intermediate member 24b, i.e. essentially flush with the periphery of the crest 28 of the second intermediate member 24b, which is favourable with respect to the design of the two coupling parts.

The respective intermediate member 24a, 24b is expandable in the axial direction of the body 26 by an internal fluid pressure in the internal bore 22 so as to urge the respective male sealing member 21a, 21b outwards in the axial direction of the body 26 against the corresponding female sealing member 11, 31 when the male coupling part 10 is connected to the female coupling part 30 with the sealing element 20 clamped between the female sealing member 11 of the male coupling part and the female sealing member 31 of the female coupling part, thereby increasing the sealing contact pressure between the respective male sealing member 21*a*, 21*b* and the corresponding female sealing member 11, 31. In order to ensure this expandability, the first intermediate member 24*a* has an internal cross-sectional area at its widest part, i.e. at its crest 28, which is larger than the external cross-sectional area of the first male sealing member 21*a* as seen at the point $P_a$ of the first male sealing member where the first male sealing member is designed to engage with the female sealing member 11 of the male coupling part 10, whereas the second intermediate member 24*b* has an internal cross-sectional area at its widest part, i.e. at its crest 28, which is larger than the external cross-sectional area of the second male sealing member 21*b* as seen at the point $P_b$ of the second male sealing member where the second male sealing member is designed to engage with the female sealing member 31 of the female coupling part 30.

Figure 10:
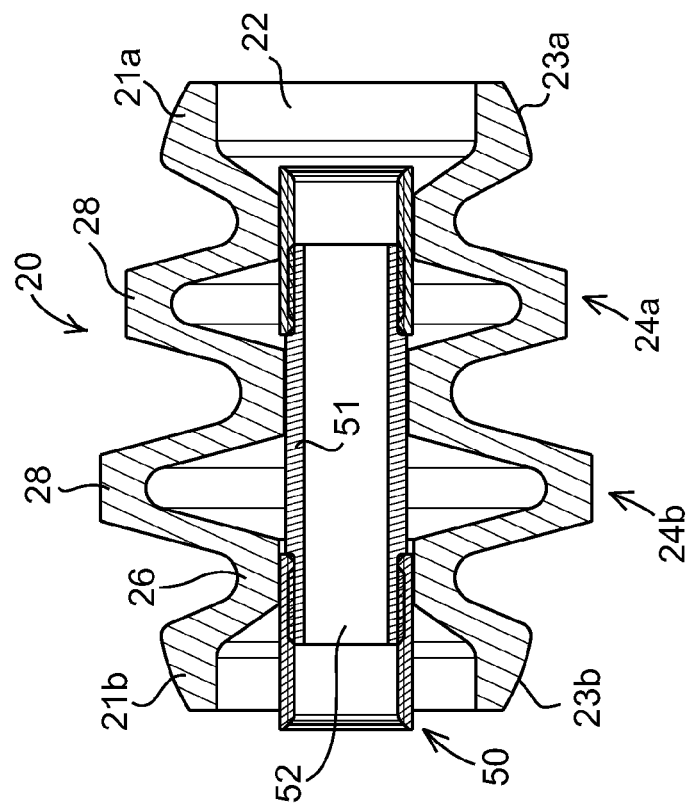
FIG. 10 shows the sealing element included in the coupling device of FIGS. 6-8 in a longitudinal section.
Figure 9:
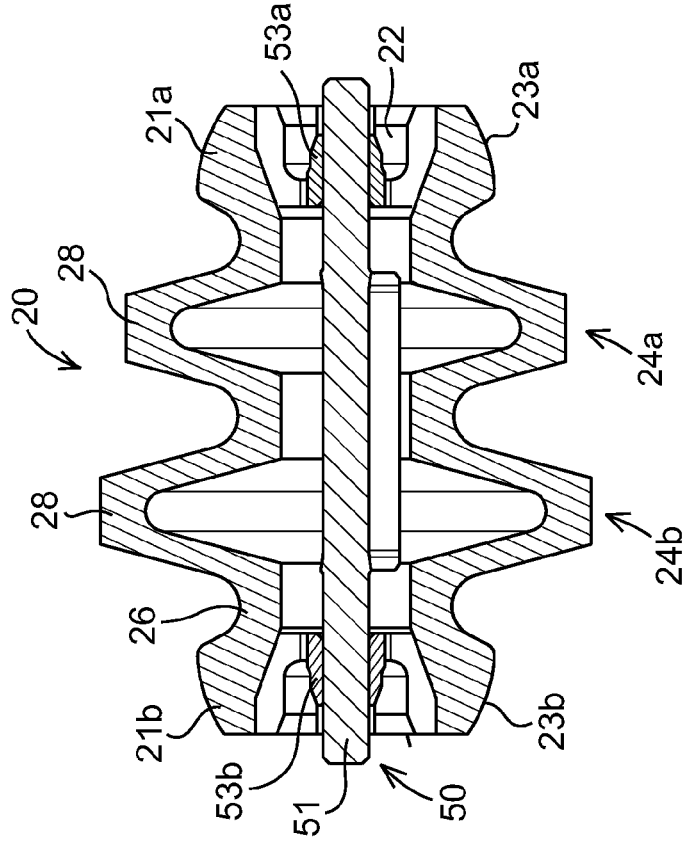
FIG. 9 shows the sealing element included in the coupling device of FIGS. 3-5 in a longitudinal section.

In the illustrated embodiments, the coupling device 1 is provided with valve means for automatically closing the internal bores 12, 32 of the coupling parts 10, 30 when the male coupling part 10 is brought out of engagement with the female coupling part 30 and automatically opening said internal bores when the male coupling part is brought into engagement with the female coupling part. The male and female coupling parts 10, 30 are each provided with a valve, which comprises a valve body 14, 34 displaceably arranged inside an internal bore 16*a*, 36*a* of the tube-shaped housing 16, 36 of the coupling part and a spring member 15, 35 acting on the valve body. The valve body 14, 34 is displaceable against the action of the associated spring member 15, 35 from a first position, in which the valve is closed and prevents fluid flow through the flow channel 12, 32 of the coupling part, to a second position, in which the valve is open and allows fluid flow through the flow channel 12, 32 of the coupling part. The male coupling part 10 is provided with an actuation member 50 for displacing the respective valve body 14, 34 from said first position to said second position immediately before the second male sealing member 21*b* is brought into engagement with the female sealing member 31 of the female coupling part 30. The actuation member 50 comprises an elongated body 51 extending through the internal bore 22 of the sealing element 20, while allowing fluid to pass through the body 51 via an internal bore 52 extending through the body 51, as illustrated in FIG. 8, or via areas between the external surface of the body 51 and the inner wall of the internal bore 22 of the sealing element, as illustrated in FIG. 5. The actuation member 50 displaces the respective valve body 14, 34 simply by pushing it inwards in the associated coupling part 10, 30 as the actuation member is moved towards the female coupling part 30 together with the male coupling part 10. In the illustrated embodiments, the actuation member 50 is displaceably arranged inside the internal bore 22 of the sealing element 20 so as to be capable of displacing the valve body 14 of the male coupling part 10 as well as the valve body 34 of the female coupling part 30 during the interconnection of the coupling parts. The actuation member 50 is suitably mounted to the sealing element 20, as illustrated in FIGS. 9 and 10. In the embodiment illustrated in FIG. 9, the body 51 of the actuation member is slidingly mounted in two hubs 53*a*, 53*b*, which are secured at the respective end of the internal bore 22 of the sealing element. In the embodiment illustrated in FIG. 10, the body 51 of the actuation member is slidingly mounted directly to inner wall surfaces of the internal bore 22 of the sealing element. As an alternative, the body 51 of the actuation member may be secured to the valve body 14 of the male coupling part 10 so as to be movable together with this valve body.

In the illustrated embodiments, the respective valve body 14, 34 is, in said first position, designed to sealingly abut against a seat 17, 37 arranged in the housing 16, 36 of the associated coupling part 10, 30, as illustrated in FIGS. 3 and 6. The valve body 14, 34 is forced against this seat 17, 37 under the action of the associated spring member 15, 35, which is fixed between the rear end of the valve body 14, 34 and a shoulder 18, 38 arranged on the outside of a tube-shaped member 19, 39, which is fixedly secured in the housing 16, 36 of the associated coupling part 10, 30 so as to be immovable in relation to said housing. The respective valve body 14, 34 is slidingly mounted on the associated tube-shaped member 19, 39. The outwardly directed end of the respective tube-shaped member 19, 39 is received in a cavity formed at the rear end 14*b*, 34*b* of the associated valve body 14, 34. When the coupling parts 10, 30 are mutually moved into contact with each other, the outer free end 53 of the body 51 of the actuation member 50 will abut against a protruding part 34*a* of the valve body 34 arranged at the outwardly directed end thereof and push this valve body 34 inwards in the female coupling part against the action of the spring member 35. At the same time, the body 51 of the actuation member 50 will push the valve body 14 inwards in the male coupling part against the action of the spring member 15. Hereby, the respective valve body 14, 34 will be displaced out of contact with the associated seat 17, 37 so as to allow fluid to flow through the respective valve, as illustrated in FIGS. 4, 5, 7 and 8. The flow path through the respective coupling device 1 is indicated with broken lines in FIGS. 5 and 8.

In the illustrated embodiments, the coupling device 1 comprises a sealing element 20 provided with two intermediate members 24*a*, 24*b* of the above-indicated type, but the inventive coupling device could also comprise a sealing element provided with more than two such intermediate members formed in series in the body 26 between the first and second male sealing members 21*a*, 21*b*.

The coupling device 1 of the present invention is suitable for use as a hydraulic subsea coupling, e.g. for coupling together conduits belonging to interconnectable processing modules in a fluid-tight manner, in particular for applications involving conditions of high pressure and high temperature, meaning elevated pressure and temperature related to deep reservoir oil and gas production. Moreover, the inventive coupling device is preferably rated for applications involving an internal pressure of 1035 bar (15 ksi) or higher, and environmental temperatures of 130° C. or higher. The inventive coupling device is hence particularly suitable for use in wellhead connector and tubing hanger applications as well as Xmas tree applications. Furthermore, the inventive coupling device is very favorable for use in multibore applications, such as ROV made-up multicoupler terminations. It should, however, be evident to a person skilled in the art that the sealing element and the coupling device according to the present invention may be used for many other purposes where a flexible and fluid-tight seal is required.

The invention is of course not in any way restricted to the preferred embodiments described above. On the contrary, many possibilities to modifications thereof will be apparent to a person with ordinary skill in the art without departing from the basic idea of the invention such as defined in the appended claims.

The invention claimed is:
1. A sealing element, comprising:
a tube-shaped body of metallic material,
a first male sealing member arranged at a first end of the body, a second male sealing member arranged at a second end of the body opposite said first end;

at least two intermediate members arranged in series in the body between the first and second male sealing members, each of said intermediate members comprising a protuberance formed in the body and extending around a center axis of the body, each one of said intermediate members being compressible so as to be adapted to store elastic energy when the body is subjected to axial compression; and an internal bore extending through the body, said internal bore extending through the first and second male sealing members and through the intermediate members, wherein the first male sealing member has an external spherical contact surface designed for mating with a corresponding internal conical contact surface of a female sealing member so as to form a fluid-tight seal between the first male sealing member and the female sealing member when their contact surfaces are pressed against each other.

2. The sealing element according to claim 1, wherein the second male sealing member has an external spherical contact surface designed for mating with a corresponding internal conical contact surface of a female sealing member so as to form a fluid-tight seal between the second male sealing member and this female sealing member when their contact surfaces are pressed against each other.

3. The sealing element according to claim 1, wherein the respective protuberance is rotationally symmetric in relation to the center axis of the body.

4. The sealing element according to claim 1, wherein the first male sealing member is coaxial with the second male sealing member and with the intermediate members.

5. The sealing element according to claim 1, wherein the intermediate members form a continuous part together with the first and second male sealing members.

6. The sealing element according to claim 1, wherein the respective intermediate member is expandable in the axial direction of the body by an internal fluid pressure in the internal bore.

7. The sealing element according to claim 1, wherein a first one of said intermediate members has an external diameter at its a widest part which is smaller than the external diameter of a second one of said intermediate members at its a widest part.

8. A coupling device, comprising:
a male coupling part,
a female coupling part,
a sealing element configured to connect the male coupling part to the female coupling part, wherein the sealing element is fixed to the male coupling part and comprises a tube-shaped body of metallic material,
a first male sealing member arranged at a first end of the body,
a second male sealing member arranged at a second end of the body opposite said first end;
at least two intermediate members arranged in series in the body between the first and second male sealing members, each one of said intermediate members comprising a protuberance arranged in the body and extending around a center axis of the body, each one of said intermediate members being compressible so as to be adapted to store elastic energy when the body is subjected to axial compression; and
an internal bore extending through the body, said internal bore extending through the first and second male sealing members and through the intermediate members;

wherein the male coupling part comprises a female sealing member, which is sealingly engaged or sealingly engageable with the first male sealing member of the sealing element;

wherein the female coupling part comprises a female sealing member, which is sealingly engageable with the second male sealing member of the sealing element; and wherein the first male sealing member has an external spherical contact surface designed for mating with a corresponding internal conical contact surface of the female sealing member of the male coupling part so as to form a fluid-tight seal between the first male sealing member and the female sealing member when their contact surfaces are pressed against each other, said conical contact surface being of metallic material.

9. The coupling device according to claim 8, wherein the second male sealing member has an external spherical contact surface designed for mating with a corresponding internal conical contact surface of the female sealing member of the female coupling part so as to form a fluid-tight seal between the second male sealing member ands the female sealing member when their contact surfaces are pressed against each other, said conical contact surface being of metallic material.

10. The coupling device according to claim 8, wherein the respective protuberance is rotationally symmetric in relation to the center axis of the body.

11. The coupling device according to claim 8, wherein the first male sealing member is coaxial with the second male sealing member and with the intermediate members.

12. The coupling device according to claim 8, wherein the intermediate members form a continuous part together with the first and second male sealing members.

13. The coupling device according to claim 8, wherein the respective intermediate member is expandable in the axial direction of the body by an internal fluid pressure in the internal bore so as to urge the respective male sealing member outwards in the axial direction of the body against the corresponding female sealing member when the male coupling part is connected to the female coupling part with the sealing element clamped between the female sealing member of the male coupling part and the female sealing member of the female coupling part, thereby increasing the sealing contact pressure between the respective male sealing member and the corresponding female sealing member.

14. The coupling device according to claim 8, wherein the intermediate members comprise a first intermediate member and an adjacent second intermediate member, and wherein the sealing element is secured to the male coupling part by a retaining member having a part received in the a space between the first intermediate member and the second intermediate member.

15. The coupling device according to claim 14, wherein the first intermediate member is located between said part of the retaining member and the first male sealing member, whereas the second intermediate member is located between said part of the retaining member and the second male sealing member.

16. The coupling device according to claim 15, wherein the first intermediate member has an external diameter at a widest part which is smaller than the external diameter of the second intermediate member at a widest part.

17. The coupling device according to claim 15, wherein the first intermediate member has an internal cross-sectional area at a widest part which is larger than the external cross-sectional area of the first male sealing member as seen at the point of the first male sealing member where the first male sealing member is designed to engage with the female sealing member of the male coupling part, and wherein the second intermediate member has an internal cross-sectional area at a widest part which is larger than the external cross-sectional area of the second male sealing member as seen at the point of the second male sealing member where the second male sealing member is designed to engage with the female sealing member of the female coupling part.

18. The coupling device according to claim 8, wherein the male coupling part and the female coupling part have a respective flow channel, said flow channels being designed to be in fluid communication with the internal bore of the sealing element when the male coupling part is connected to the female coupling part.

19. The coupling device according to claim 18, wherein:
at least one of the male and female coupling parts comprises a valve, which comprises a displaceable valve body and a spring member acting on the valve body, the valve body being displaceable against the action of the spring member from a first position, in which the valve is closed and prevents fluid flow through the flow channel of the coupling part, to a second position, in which the valve is open and allows fluid flow through the flow channel of the coupling part; and
at least one of the coupling parts comprises an actuation member for displacing the valve body from said first position to said second position immediately before the second male sealing member is brought into engagement with the female sealing member of the female coupling part.

20. The coupling device according to claim 19, wherein both of said coupling parts comprise a valve.

21. The coupling device according to claim 20, wherein the actuation member is displaceably arranged inside the internal bore of the sealing element so as to be configured to displace the valve body of the male coupling part and the valve body of the female coupling part from said first position to said second position immediately before the second male sealing member is brought into engagement with the female sealing member of the female coupling part.

22. The coupling device according to claim 18, wherein the respective coupling part comprises a tube-shaped housing, through which the flow channel of the coupling part extends and which comprises a thread so as to allow the housing to be secured to an associated connecting body by being threaded into the housing.

23. The coupling device according to claim 22, wherein the thread of the respective housing constitutes an external thread designed to fit into an internal thread of the associated connecting body.

24. The coupling device according to claim 8, wherein the coupling device comprises a hydraulic subsea coupling.

25. A sealing element, comprising:
a tube-shaped body of metallic material;
a first male sealing member arranged at a first end of the body;
a second male sealing member arranged at a second end of the body opposite said first end;
at least two intermediate members arranged in series in the body between the first and second male sealing members, each of said intermediate members comprising a protuberance formed in the body and extending around a center axis of the body, each one of said intermediate members being compressible so as to be adapted to store elastic energy when the body is subjected to axial compression; and an internal bore extending through the body, said internal bore extending through the first and second male sealing members and through the intermediate members,
wherein a first one of said intermediate members has an external diameter at a widest part which is smaller than the external diameter of a second one of said intermediate members at a widest part.

26. A coupling device, comprising:
a male coupling part;
a female coupling part;
a sealing element configured to connect the male coupling part to the female coupling part, wherein the sealing element is fixed to the male coupling part and comprises a tube-shaped body of metallic material;
a first male sealing member arranged at a first end of the body;
a second male sealing member arranged at a second end of the body opposite said first end;
at least two intermediate members arranged in series in the body between the first and second male sealing members, each one of said intermediate members comprising a protuberance arranged in the body and extending around a center axis of the body, each one of said intermediate members being compressible so as to be adapted to store elastic energy when the body is subjected to axial compression; and
an internal bore extending through the body, said internal bore extending through the first and second male sealing members and through the intermediate members,
wherein the male coupling part comprises a female sealing member, which is sealingly engaged or sealingly engageable with the first male sealing member of the sealing element,
wherein the female coupling part comprises a female sealing member, which is sealingly engageable with the second male sealing member of the sealing
wherein the male coupling part and the female coupling part have a respective flow channel, said flow channels being designed to be in fluid communication with the internal bore of the sealing element when the male coupling part is connected to the female coupling part, and
wherein the respective coupling part comprises a tube-shaped housing, through which the flow channel of the coupling part extends and which comprises a thread so as to allow the housing to be secured to an associated connecting body by being threaded into the housing.

27. A coupling device, comprising:
a male coupling part;
a female coupling part;
a sealing element configured to connect the male coupling part to the female coupling part, wherein the sealing element is fixed to the male coupling part and comprises a tube-shaped body of metallic material;
a first male sealing member arranged at a first end of the body;
a second male sealing member arranged at a second end of the body opposite said first end;
at least two intermediate members arranged in series in the body between the first and second male sealing members, each one of said intermediate members comprising a protuberance arranged in the body and extending around a center axis of the body, each one of said intermediate members being compressible so as to be adapted to store elastic energy when the body is subjected to axial compression; and an internal bore extending through the body, said internal bore extending through the first and second male sealing members and through the intermediate members, wherein the male coupling part comprises a female sealing member, which is sealingly engaged or sealingly engageable with the first male sealing member of the sealing element, wherein the female coupling part comprises a female sealing member, which is sealingly engageable with the second male sealing member of the sealing element, and wherein the coupling device comprises a hydraulic subsea coupling.

* * * * *